(12) United States Patent
Jang et al.

(10) Patent No.: US 12,234,252 B2
(45) Date of Patent: Feb. 25, 2025

(54) TRANSITION METAL COMPOUND AND CATALYST COMPOSITION COMPRISING SAME

(71) Applicant: LG Chem, Ltd., Seoul (KR)

(72) Inventors: Jae Kwon Jang, Daejeon (KR); Seung Hyo Kim, Daejeon (KR); Seung Hwan Jung, Daejeon (KR); A Rim Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 726 days.

(21) Appl. No.: 17/294,522

(22) PCT Filed: Nov. 22, 2019

(86) PCT No.: PCT/KR2019/016167
§ 371 (c)(1),
(2) Date: May 17, 2021

(87) PCT Pub. No.: WO2020/106107
PCT Pub. Date: May 28, 2020

(65) Prior Publication Data
US 2022/0024951 A1    Jan. 27, 2022

(30) Foreign Application Priority Data

Nov. 22, 2018 (KR) .......... 10-2018-0145546
Nov. 20, 2019 (KR) .......... 10-2019-0149757

(51) Int. Cl.
C07F 7/00 (2006.01)
C08F 4/6592 (2006.01)

(52) U.S. Cl.
CPC ............ *C07F 7/00* (2013.01); *C08F 4/65922* (2013.01)

(58) Field of Classification Search
CPC ......... C07F 7/00; C07F 17/00; C08F 4/65922
See application file for complete search history.

(56) References Cited

U.S. PATENT DOCUMENTS

| | | | |
|---|---|---|---|
| 5,064,802 A | 11/1991 | Stevens et al. | |
| 5,132,380 A | 7/1992 | Stevens et al. | |
| 6,515,155 B1 | 2/2003 | Klosin et al. | |
| 2003/0017939 A1* | 1/2003 | Okumura | B01J 31/128 526/170 |
| 2005/0285284 A1 | 12/2005 | Thorn et al. | |
| 2009/0170690 A1 | 7/2009 | Murray et al. | |
| 2011/0059840 A1 | 3/2011 | Murray et al. | |
| 2012/0059134 A1 | 3/2012 | Yang et al. | |
| 2012/0071615 A1 | 3/2012 | Lim et al. | |
| 2012/0149855 A1 | 6/2012 | Murray et al. | |
| 2014/0213744 A1 | 7/2014 | Hlavinka et al. | |
| 2021/0317238 A1 | 10/2021 | Welle et al. | |

FOREIGN PATENT DOCUMENTS

| | | |
|---|---|---|
| CN | 1993373 A | 7/2007 |
| CN | 101910211 A | 12/2010 |
| CN | 103108894 A | 5/2013 |
| CN | 103965378 A | 8/2014 |
| CN | 108530490 A | 9/2018 |
| CN | 108530492 A | 9/2018 |
| JP | 2005200453 A * | 7/2005 |
| KR | 20100098670 A | 9/2010 |
| KR | 20120028269 A | 3/2012 |
| KR | 101785705 B1 | 10/2017 |
| WO | 2009085124 A1 | 7/2009 |
| WO | 2014120548 A1 | 8/2014 |
| WO | 2018046566 A1 | 3/2018 |

OTHER PUBLICATIONS

S. Kim, et.al. Eur. J. Inorg. Chem. 537-545 (2007) (Year: 2007).*
X. Xiao, et al., 267 Journal of Molecular Catalysis A: Chemical 86-91 (2007) (Year: 2007).*
Hongkun Tian et al., "An asymmetric oligomer based on thienoacene for solution processed crystal organic thin-film transistors", Chemical Communications, 2012, 48, pp. 3557-3559.
International Search Report for Application No. PCT/KR2019/016167, dated Mar. 9, 2020, 3 pages. .
Extended European Search Report for EP Application No. 19887735 dated Dec. 2, 2021, 2 pgs.

* cited by examiner

*Primary Examiner* — Alexander R Pagano
*Assistant Examiner* — Frank S. Hou
(74) *Attorney, Agent, or Firm* — Lerner David LLP

(57) ABSTRACT

A novel transition metal compound and a catalyst composition including same are disclosed herein. In some embodiments, the transition metal compound is represented by formula 1 disclosed herein. In some embodiments, the catalyst composition comprises the transition metal compound represented by formula 1. The catalyst composition may be useful for preparing an olefin-based polymer having a high molecular weight in a low density region, and may be useful for preparing an olefin-based polymer having a low melting index (MI) in high temperature conditions and a high molecular weight.

11 Claims, No Drawings

TRANSITION METAL COMPOUND AND CATALYST COMPOSITION COMPRISING SAME

CROSS-REFERENCE TO RELATED APPLICATIONS

The present application is a national phase entry under 35 U.S.C. § 371 of International Application No. PCT/KR2019/016167, filed on Nov. 22, 2019, which claims priority from Korean Patent Application Nos. 10-2018-0145546, filed on Nov. 22, 2018, and 10-2019-0149757, filed on Nov. 20, 2019, the entire contents of which are incorporated herein by reference.

TECHNICAL FIELD

The present invention relates to a transition metal compound having a novel structure and a catalyst composition including same.

BACKGROUND ART

Generally, olefin polymers such as an ethylene copolymer are useful polymer materials used as the material for hollow molded product, an extrusion molded product, a film, a sheet, etc., and have been prepared in the presence of a Ziegler-Natta catalyst system.

The Ziegler-Natta catalyst is a heterogeneous catalyst and is a catalyst used in a system in which the phase of a reactant and the phase of a catalyst are not the same, for example, a system of liquid reactant-solid catalyst, or the like. Such a Ziegler-Natta catalyst is composed of two components and is generally composed of a halogen compound of a transition metal including titanium (Ti), vanadium (V), chromium (Cr), molybdenum (Mo), and zirconium (Zr) (for example, $TiCl_4$), alkyllithium, alkylaluminum, etc.

However, the Ziegler-Natta catalyst has the concentration of active species of a few % to tens of % with respect to a transition metal atom, and most transition metal atoms may not demonstrate their function and have defects of not overcoming the limitations as a heterogeneous catalyst.

Recently, as a next generation catalyst which may overcome such defects, metallocene compounds have received the attention. The metallocene compounds are homogeneous catalysts including a metal in group 4 and are known to show desirable polymerization activity in olefin polymerization. $[Me_2Si(Me_4C_5)NtBu]TiCl_2$ (Constrained-Geometry Catalyst, hereinafter, will be abbreviated as CGC) was reported by Dow Co. in the early 1990s (U.S. Pat. No. 5,064,802), and excellent aspects of the CGC in the copolymerization reaction of ethylene and alpha-olefin may be summarized in the following two points when compared to commonly known metallocene catalysts: (1) at a high polymerization temperature, high activity is shown and a polymer having high molecular weight is produced, and (2) the copolymerization degree of alpha-olefin having large steric hindrance such as 1-hexene and 1-octene is excellent. In addition, as various properties of the CGC during performing a polymerization reaction are gradually known, efforts of synthesizing the derivatives thereof and using as a polymerization catalyst have been actively conducted in academy and industry.

Most metallocene catalysts used for polymerization include a metal element in group 4 such as titanium, zirconium, and hafnium (Hf) and a supporting ligand as a precursor, and are composed of two aromatic five-member rings and two halogen compounds which are leaving groups. Among them, an aromatic cyclopentadienyl group is generally used as the supporting ligand which is coordinated in a central metal.

Such a metallocene catalyst is used in a variety of applications including an olefin polymerization process, however, the catalyst activity showed some limitations (particularly in a solution process at temperature conditions of 100° C. or higher), and it is known that, for example, due to relatively rapid terminal termination reaction (or chain reaction) such as beta-hydride elimination reaction, an olefin polymer with a low molecular weight showing a molecular weight (Mn) of 20,000 or less at a temperature of 100° C. or higher may be prepared. In addition, the active species of the metallocene catalyst is known to be deactivated at a temperature of 100° C. or higher. Accordingly, in order to increase the applicability of the metallocene catalyst, methods for overcoming the above-mentioned limitations are necessary.

DISCLOSURE OF THE INVENTION

Technical Problem

A first task to solve in the present invention is to provide a novel transition metal compound.

A second task to solve in the present invention is to provide a catalyst composition including the transition metal compound.

Technical Solution

To solve the above-described first task, there is provided in the present invention a transition metal compound represented by the following Formula 1:

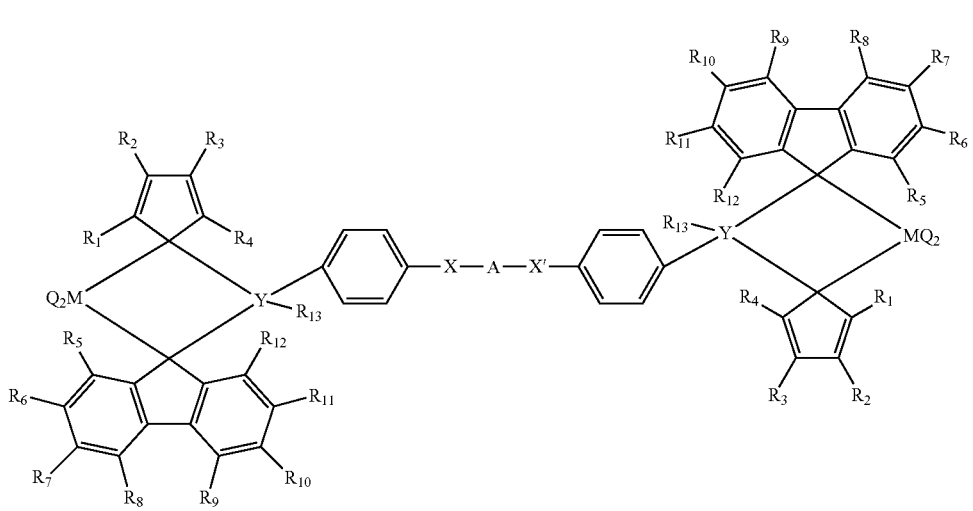

[Formula 1]

in Formula 1, $R_1$ to $R_{13}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; arylalkyl of 7 to 20 carbon atoms; silyl; or silyl having one to three substituents selected from the group consisting of alkyl of 1 to 12 carbon atoms and alkoxy of 1 to 12 carbon atoms, where adjacent two or more groups among $R_1$ to $R_{12}$ may be connected with each other to form a ring, X and X' are each independently O, S or a connecting group, A is alkylene of 1 to 6 carbon atoms, Y is C or Si, M is a transition metal in group 4, and Q is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to carbon atoms; arylalkyl of 7 to 20 carbon atoms; alkylamino of 1 to 20 carbon atoms; or arylamino of 6 to 20 carbon atoms.

To solve the above-described second task, there is provided in the present invention a catalyst composition including the transition metal compound of Formula 1 above.

Advantageous Effects

The transition metal compound of the present invention may be useful as a catalyst of polymerization reaction for preparing an olefin-based polymer having a high molecular weight in a low density region, and may be useful for preparing an olefin-based polymer having a low melt index (MI) in high temperature conditions and a high molecular weight.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "halogen" used in the present description means fluorine, chlorine, bromine or iodine unless otherwise noted.

The term "alkyl" used in the present description means linear, cyclic or branched hydrocarbon residue unless otherwise noted, and nonlimiting examples include methyl, ethyl, n-propyl, isopropyl, n-butyl, isobutyl, t-butyl, n-pentyl, isopentyl and hexyl.

The term "cycloalkyl" used in the present description means nonaromatic cyclic hydrocarbon radical composed of carbon atoms unless otherwise noted. Nonlimiting examples of the "cycloalkyl" include cyclopropyl, cyclobutyl, cyclopentyl, cyclohexyl and cycloheptyl.

The term "aryl" used in the present description refers to an optionally substituted benzene ring, or a ring system which may be formed by fusing one or more optional substituents, unless otherwise noted. Exemplary optional substituent includes substituted $C_{1-3}$ alkyl, substituted $C_{2-3}$ alkenyl, substituted $C_{2-3}$ alkynyl, heteroaryl, heterocyclic, aryl, alkoxy optionally having 1 to 3 fluorine substituents, aryloxy, aralkoxy, acyl, aroyl, heteroaroyl, acyloxy, aroyloxy, heteroaroyloxy, sulfanyl, sulfinyl, sulfonyl, aminosulfonyl, sulfonylamino, carboxyamide, aminocarbonyl, carboxy, oxo, hydroxyl, mercapto, amino, nitro, cyano, halogen or ureido. Such a ring or ring system may be optionally fused to an aryl ring (for example, benzene ring), carbon ring or heterocyclic ring, optionally having one or more substituents. Nonlimiting examples of the "aryl" group include phenyl, naphthyl, tetrahydronaphthyl, biphenyl, indanyl, anthracyl or phenanthryl, and substituted derivatives thereof.

The term "alkenyl" used in the present description means linear or branched hydrocarbon radical having one or more carbon-carbon double bonds. Examples of the "alkenyl" used in the present application include ethenyl and propenyl, without limitation.

The term "alkoxy" used in the present description refers to a $-OR_a$ group, where Ra is the alkyl defined above. Nonlimiting examples of the "alkoxy" include methoxy, difluoromethoxy, trifluoromethoxy, ethoxy, n-propoxy, isopropoxy, n-butoxy and t-butoxy.

In the present description, "silyl" means an unsubstituted silyl, or a silyl group which is substituted with one or more substituents. Nonlimiting examples of the "silyl" include silyl, trimethylsilyl, triethylsilyl, isopropyldimethylsilyl, t-butyldimethylsilyl, t-butyldiphenylsilyl, hexyldimethylsilyl, methoxymethylsilyl, (2-methoxyethoxy)methylsilyl, trimethoxysilyl and triethoxysilyl.

The transition metal compound of the present invention is represented by the following Formula 1:

[Formula 1]

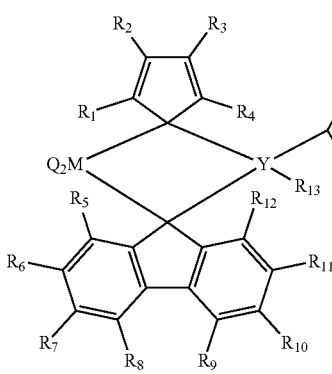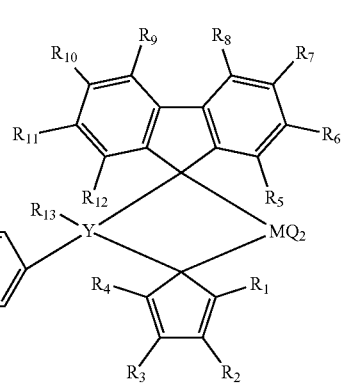

$R_1$ to $R_{13}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; arylalkyl of 7 to 20 carbon atoms; silyl; or silyl having one to three substituents selected from the group consisting of alkyl of 1 to 12 carbon atoms and alkoxy of 1 to 12 carbon atoms, where adjacent two or more groups among $R_1$ to $R_{12}$ may be connected with each other to form a ring, X and X' are each independently O, S or a connecting group, A is alkylene of 1 to 6 carbon atoms, Y is C or Si, M is a transition metal in group 4, and Q is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In case of applying the transition metal compound as a catalyst in olefin polymerization, a polyolefin showing high activity at a high polymerization temperature, a high copolymerization degree and a high molecular weight may be prepared. Particularly, due to the structural characteristics of the catalyst, a linear polyethylene having a high molecular weight and a low density to a degree of 0.860 g/cc to 0.930 g/cc may be prepared.

In addition, in the transition metal compound of Formula 1 according to an embodiment of the present invention, $R_1$ to $R_{12}$ may be each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; silyl; or silyl having one to three substituents selected from the group consisting of alkyl of 1 to 12 carbon atoms and alkoxy of 1 to 12 carbon atoms, where adjacent two or more groups among $R_1$ to $R_{12}$ may be connected with each other to form a ring, $R_{13}$ may be hydrogen; halogen; alkyl of 1 to 12 carbon atoms; cycloalkyl of 3 to 12 carbon atoms; aryl of 6 to 12 carbon atoms; alkylaryl of 7 to 12 carbon atoms; or arylalkyl of 7 to 12 carbon atoms, X and X' may be each independently O, S or a connecting group, A is alkylene of 1 to 6 carbon atoms, Y may be C or Si, M may be Ti, Zr or Hf, and Q may be hydrogen; halogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms.

In addition, in the transition metal compound of Formula 1 according to another embodiment of the present invention, $R_1$ to $R_{12}$ may be each independently hydrogen; alkyl of 1 to 12 carbon atoms; cycloalkyl of 3 to 12 carbon atoms; silyl; or silyl having one to three substituents selected from the group consisting of alkyl of 1 to 12 carbon atoms and alkoxy of 1 to 12 carbon atoms, where adjacent two or more groups among $R_1$ to $R_{12}$ may be connected with each other to form a ring, $R_{13}$ may be hydrogen; alkyl of 1 to 12 carbon atoms; aryl of 6 to 12 carbon atoms; alkylaryl of 7 to 12 carbon atoms; or arylalkyl of 7 to 12 carbon atoms, X and X' may be each independently O, S or a connecting group, A may be alkylene of 1 to 6 carbon atoms, Y may be C or Si, M may be Ti, Zr or Hf, and Q may be hydrogen; halogen; alkyl of 1 to 12 carbon atoms; or cycloalkyl of 3 to 12 carbon atoms.

In an embodiment of the present invention, the transition metal compound of Formula 1 may be a transition metal compound represented by the following Formula 1a:

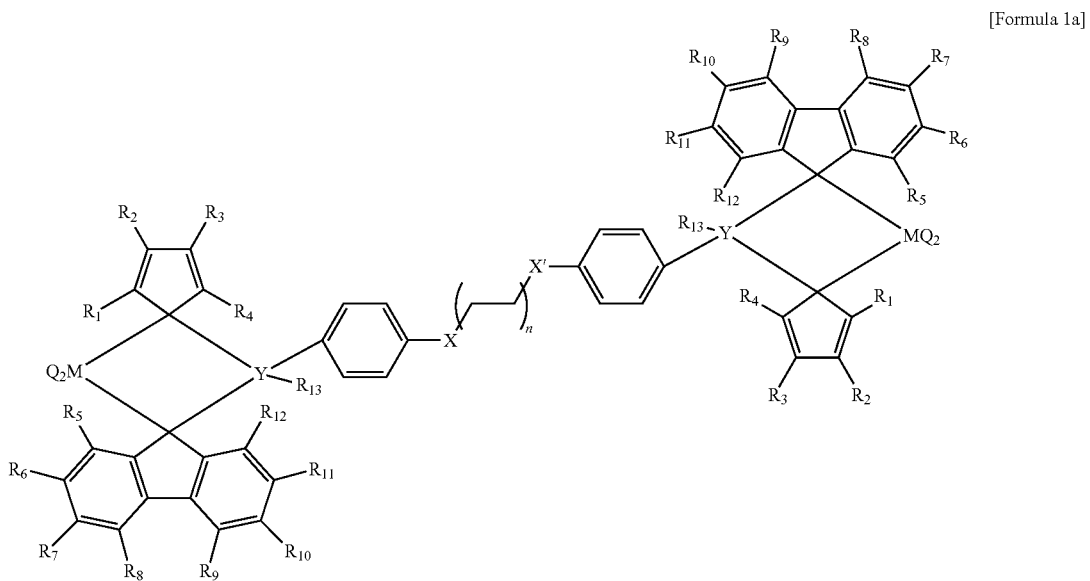

[Formula 1a]

in Formula 1a, $R_1$ to $R_{13}$, X, X', M, Y and Q are the same as defined in Formula 1, and n is an integer of 1, 2 or 3.

In addition, in an embodiment of the present invention, the transition metal compound of Formula 1 may be a compound represented by the following Formula 2:

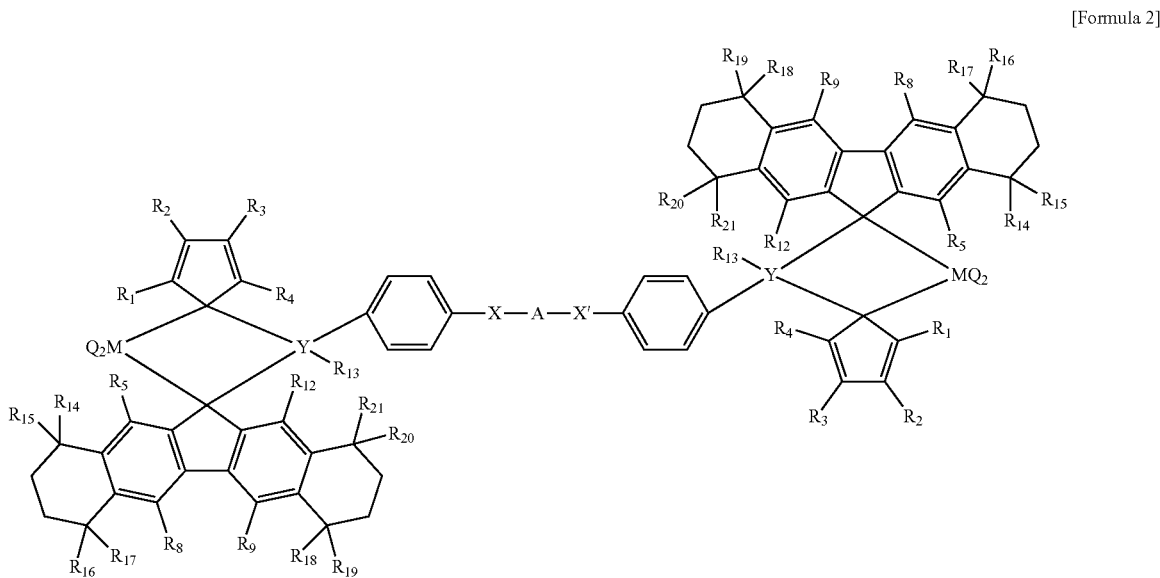

[Formula 2]

in Formula 2, $R_1$ to $R_4$, $R_5$, $R_8$, $R_9$ and $R_{12}$ may be each independently hydrogen or alkyl of 1 to 12 carbon atoms, $R_{13}$ may be hydrogen, alkyl of 1 to 12 carbon atoms, aryl of 6 to 12 carbon atoms; or alkylaryl of 7 to 12 carbon atoms, $R_{14}$ to $R_{21}$ may be each independently hydrogen or alkyl of 1 to 6 carbon atoms, X and X' may be each independently O, S or a connecting group, A may be alkylene of 1 to 6 carbon atoms, Y may be C or Si, M may be Hf, and Q may be halogen or alkyl of 1 to 12 carbon atoms.

In addition, in the transition metal compound of Formula 2, $R_1$ to $R_4$, $R_5$, $R_8$, $R_9$ and $R_{12}$ may be hydrogen, $R_{13}$ may be aryl of 6 to 12 carbon atoms, X and X' may be each independently O, S or a connecting group, A may be ethylene, Y may be C, M may be Hf, and Q may be alkyl of 1 to 6 carbon atoms.

In an embodiment of the present invention, the transition metal compound of Formula 2 may be a transition metal compound represented by the following Formula 2a:

[Formula 2a]

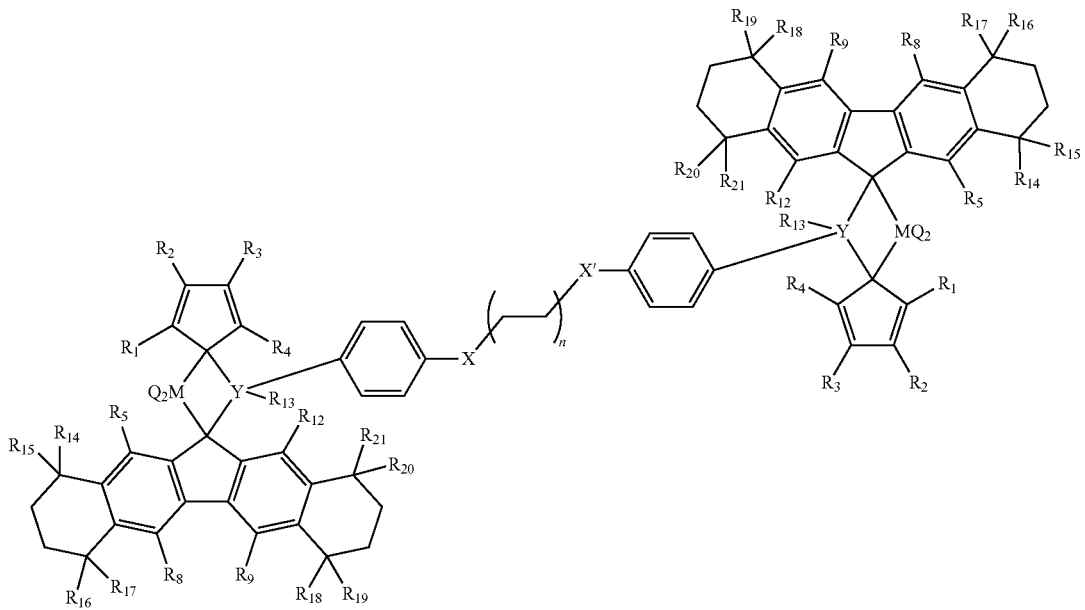

in Formula 2a, $R_1$ to $R_{13}$, X, X', M, Y and Q are the same as defined in Formula 1, and n is an integer of 1, 2 or 3. In an embodiment, n may be 1.

The compound represented by Formula 1 may particularly be a compound represented by any one among the following Formulae 1-1 and 1-2:

[Formula 1-1]

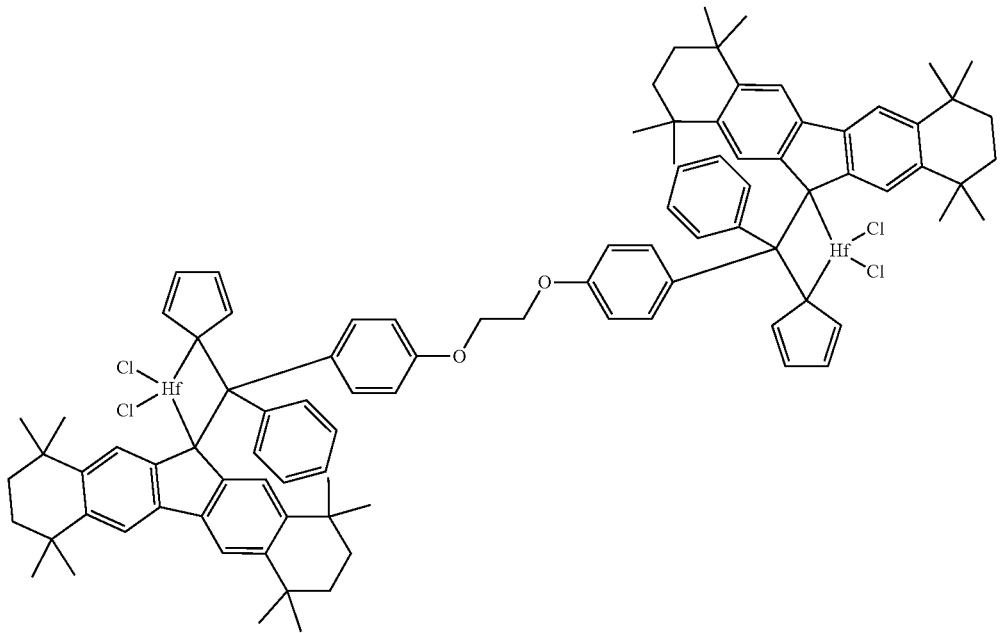

[Formula 1-2]

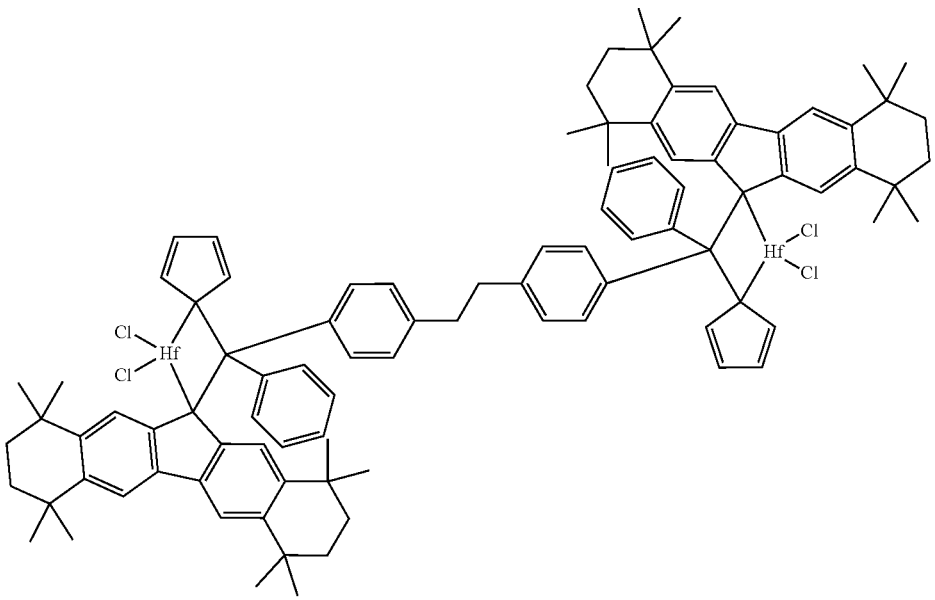

The transition metal compound of Formula 1 may particularly be used for preparing a catalyst for polymerizing an olefin monomer, and may be used in all other fields in which the transition metal compound may be used, without limitation.

The present invention also provides a catalyst composition including the compound of Formula 1.

The catalyst composition may further include a cocatalyst. The cocatalyst may use any one known in this art.

For example, the catalyst composition may further include at least one of the following Formulae 3 to 5 as a cocatalyst:

[Al($R_{22}$)—O]$_a$—  [Formula 3]

in the above formula, $R_{22}$ is each independently a halogen radical; a hydrocarbyl radical of 1 to 20 carbon atoms; or a halogen substituted hydrocarbyl radical of 1 to 20 carbon atoms; and a is an integer of 2 or more;

D($R_{22}$)$_3$  [Formula 4]

in the above formula, D is aluminum or boron; $R_{22}$ is each independently a halogen radical; a hydrocarbyl radical of 1 to 20 carbon atoms; or a halogen substituted hydrocarbyl radical of 1 to 20 carbon atoms; and a is an integer of 2 or more; and

[L-H]$^+$[Z(A)$_4$]$^-$ or [L]$^+$[Z(A)$_4$]$^-$  [Formula 5]

in the above formula, L is a neutral or a cationic Lewis base; H is a hydrogen atom; Z is an element in group 13; A is each independently aryl of 6 to 20 carbon atoms or alkyl of 1 to 20 carbon atoms, where one or more hydrogen atoms may be substituted with substituents; and the substituent is halogen, hydrocarbyl of 1 to 20 carbon atoms, alkoxy of 1 to 20 carbon atoms or aryloxy of 6 to 20 carbon atoms.

As a preparation method of the catalyst composition, there is provided a first preparation method including a step of obtaining a mixture by contacting the transition metal compound represented by Formula 1 with the compound represented by Formula 3 or Formula 4; and a step of adding the compound represented by Formula 5 to the mixture.

Also, there is provided a second preparation method of the catalyst composition including contacting the transition metal compound represented by Formula 1 with the compound represented by Formula 5.

In the first method among the preparation methods of the catalyst composition, the molar ratio of the compound represented by Formula 3 or Formula 4 with respect to the transition metal compound of Formula 1 may be, from 1:2 to 1:5,000, particularly, from 1:10 to 1:1,000, more particularly, from 1:20 to 1:500, respectively.

Meanwhile, the molar ratio of the compound represented by Formula 5 with respect to the transition metal compound of Formula 1 may be from 1:1 to 1:25, particularly, from 1:1 to 1:10, more particularly, from 1:1 to 1:5.

If the molar ratio of the compound represented by Formula 3 or Formula 4 with respect to the transition metal compound of Formula 1 is less than 1:2, the amount of an alkylating agent is very small, and the alkylation of the metal compound may be incompletely achieved, and if the molar ratio is greater than 1:5,000, the alkylation of the metal compound may be achieved, but side reactions between the remaining excessive alkylating agent and the activating agent of Formula 5 may be carried out, and the activation of the alkylated metal compound may be incompletely achieved. In addition, if the molar ratio of the compound represented by Formula 5 with respect to the transition metal compound of Formula 1 is less than 1:1, the amount of the activating agent is relatively small, and the activation of the metal compound may be incompletely achieved, and thus, the activity of the catalyst composition may be reduced, and if the molar ratio is greater than 1:25, the activation of the metal compound may be completely achieved, but the excessive amount of the activating agent remained may increase the production cost of the catalyst composition, or the purity of the polymer thus prepared may decrease.

In the second method among the preparation methods of the catalyst composition, the molar ratio of the compound represented by Formula 5 with respect to the transition metal compound of Formula 1 may be from 1:1 to 1:500, particularly, from 1:1 to 1:50, more particularly, from 1:2 to 1:25.

If the molar ratio is less than 1:1, the amount of the activating agent is relatively small, the activation of the metal compound may be incompletely achieved, and the activity of the catalyst composition thus prepared may be reduced, and if the molar ratio is greater than 1:500, the activation of the metal compound may be completely achieved, but the excessive amount of activating agent remained may increase the unit cost of the catalyst composition, or the purity of the polymer thus prepared may decrease.

As the reaction solvent used during the preparation of the composition, a hydrocarbon-based solvent such as pentane, hexane, and heptane, or an aromatic solvent such as benzene, and toluene may be used, but the present invention is not limited thereto, and all solvents used in this technical field may be used.

In addition, the transition metal compound of Formula 1 and the cocatalyst may be used in a supported type by a support. Silica or alumina may be used as the support.

The compound represented by Formula 3 is not specifically limited as long as it is alkylaluminoxane. Particular examples thereof may include methylaluminoxane, ethylaluminoxane, isobutylaluminoxane, butylaluminoxane, etc., more particularly, methylaluminoxane.

The compound represented by Formula 4 is not specifically limited, and particular examples thereof may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and more particularly, the compound is selected from trimethylaluminum, triethylaluminum, and triisobutylaluminum.

Examples of the compound represented by Formula 5 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl) aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl) boron, tripropylammoniumtetra(p-tolyl) boron, triethylammoniumtetra(o, p-dimethylphenyl) boron, trimethylammoniumtetra(o, p-dimethylphenyl) boron, tributylammoniumtetra(p-trifluoromethylphenyl) boron, trimethylammoniumtetra(p-trifluoromethylphenyl) boron, tributylammoniumtetrapentafluorophenylboron, N, N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, etc.

A polyolefin homopolymer or copolymer may be prepared by contacting a catalyst composition including the transition metal compound of Formula 1; and one or more compounds selected from the compounds represented by Formula 3 to Formula 5, with one or more olefin monomers.

The particular preparation process using the catalyst composition is a solution process. If the composition is used together with an inorganic support such as silica, it may also be applied to a slurry process or a gas phase process.

In the preparation process, the activating catalyst composition may be injected after being dissolved or diluted in an aliphatic hydrocarbon solvent of 5 to 12 carbon atoms such as pentane, hexane, heptane, nonane, decane and an isomer thereof, an aromatic hydrocarbon solvent such as toluene and benzene, or a hydrocarbon solvent substituted with a chlorine atom, such as dichloromethane and chlorobenzene, which are appropriate for an olefin polymerization process. The solvent used may preferably be used after removing a small amount of water or air, which functions as a catalyst poison, by treating with a small amount of alkylaluminum, and may be used by further using a cocatalyst.

The olefin monomer which is polymerizable using the metal compound and the cocatalyst may include, for example, ethylene, an alpha-olefin, a cyclic olefin, etc., and a diene olefin-based monomer, a triene olefin-based monomer, etc. having two or more double bonds may also be polymerized. Particular examples of the monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-icocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc. Two or more of the monomers may be mixed and copolymerized.

Particularly, in the preparation method of the present invention, the catalyst composition has characteristics of preparing a copolymer having a high molecular weight and very low density including a polymer density of 0.890 g/cc or less, in a copolymerization reaction of ethylene and a monomer having large steric hindrance such as 1-octene even at a high reaction temperature of 90° C. or higher, particularly, at a high reaction temperature of 150° C. or higher.

According to an embodiment of the present invention, the polymer prepared by the preparation method of the present invention has a density of 0.890 g/cc or less.

According to an embodiment of the present invention, the polymer prepared by the preparation method of the present invention has a density of 0.880 g/cc or less.

In addition, according to an embodiment of the present invention, if a polymer is formed using the transition metal catalyst of Formula 1, the peak of a melting temperature (Tm) may have a single phase or two peaks.

Tm may be obtained by using a differential scanning calorimeter (DSC; Differential Scanning calorimeter 6000) manufactured by PerkinElmer Co., and may be obtained by increasing the polymer temperature to 100° C., maintaining the temperature for 1 minute, then decreasing the temperature to −100° C., and then, increasing the temperature again and measuring the apex of a DSC curve as a melting point (melting temperature).

According to an embodiment of the present invention, the polymer prepared by the preparation method of the present invention has Tm of 100° C. or less.

According to an embodiment of the present invention, Tm of the polymer prepared by the preparation method of the present invention may show one peak or two peaks.

According to an embodiment of the present invention, the polymer prepared by the preparation method of the present invention may have a weight average molecular weight of 200,000 g/mol or more.

According to an embodiment of the present invention, the polymer prepared by the preparation method of the present invention may have a weight average molecular weight of 250,000 g/mol or more, and the polymer prepared by the preparation method of the present invention may have a weight average molecular weight of 600,000 g/mol or less, particularly, 500,000 g/mol or less.

The weight average molecular weight (Mw) is a converted numerical with respect to standard polystyrene measured using gel permeation chromatography (GPC, manufactured by Waters Co.). However, the weight average molecular weight may be measured by other methods known in the art, without limitation.

According to an embodiment of the present invention, the polymer prepared by the preparation method of the present invention has a $MI_{10}$ value of 3 g/10 min or less, particularly, a $MI_{10}$ value of 0.01 g/10 min to 2 g/10 min, more particularly, a $MI_{10}$ value of 0.1 g/10 min to 0.5 g/10 min. The $MI_{10}$ value is a melt index under a load of 10 kg and 190° C. and is a numerical reflecting the number of long chain branches (LCB) in the main chain of the polymer. The fact that the polymer prepared by the preparation method of the present invention has a $MI_{10}$ value in the above-described range implies that the catalyst composition including the transition metal compound of the present invention may control the production of the long chain branches in the main chain of the polyolefin-based polymer thus prepared.

In addition, according to an embodiment of the present invention, the polymer prepared by the preparation method of the present invention has a $MI_{2.16}$ value of 0.005 g/10 min to 0.5 g/10 min, particularly, a $MI_{2.16}$ value of 0.01 g/10 min to 0.1 g/10 min, more particularly, a $MI_{2.16}$ value of 0.01 g/10 min to 0.02 g/10 min.

Meanwhile, according to an embodiment of the present invention, the polymer prepared by the preparation method of the present invention has a molten flow rate ratio (MFRR) of 1 to 20, particularly, a molten flow rate ratio (MFRR) of 5 to 15, more particularly, 7 to 12. The molten flow rate ratio (MFRR) means a ratio obtained through dividing $MI_{10}$ (melt index under a load of 10 kg and 190° C.) by $MI_{2.16}$ (melt index under a load of 2.16 kg and 190° C.). A low MFRR value may be shown according to the decrease of the number of the long chain branches (LCB) of the polymer, thereby improving the mechanical properties of the polymer.

MODE FOR CARRYING OUT THE INVENTION

Hereinafter, the present invention will be explained more particularly referring to the following examples.

However, the examples are for assisting the understanding of the present invention, and the scope of the present invention is not limited thereto.

Synthesis of Ligand and Transition Metal Compound

Organic reagents and solvents were purchased from Aldrich Co. and used after purifying by a standard method unless otherwise noted. In all steps of syntheses, air and humidity were blocked to increase the reproducibility of experiments.

Example 1: Preparation of Ligand Compound and Transition Metal Compound

Step 1: Preparation of ((ethane-1,2-diylbis(oxy))bis (4,1-phenylene))bis(phenylmethanone)

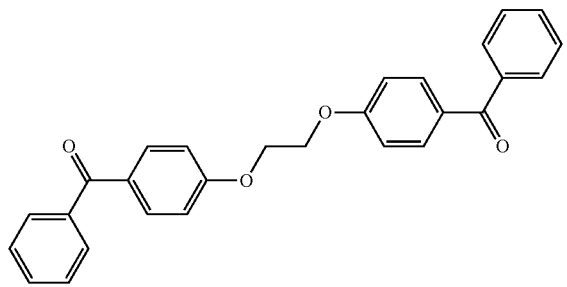 [SMILES: O=C(c1ccccc1)c1ccc(OCCOc2ccc(C(=O)c3ccccc3)cc2)cc1]

To a 100 mL Schlenk flask, 1,2-diphenoxyethane (5.25 g, 24.5 mmol), $AlCl_3$ (7.20 g) and 1,2-dichloroethane (87.5 ml) were put. Benzoyl chloride (2.05 eq, 7.06 g) was slowly added thereto dropwisely at room temperature. Stirring was performed at 65° C. overnight. After that, the reaction product was extracted with ice water, 10% HCl, and distilled water to obtain a final compound.

$^1$H NMR (CDCl$_3$): 7.86 (d, 4H), 7.77 (d, 4H), 7.58 (m, 2H), 7.50 (m, 4H), 7.04 (d, 4H), 4.56 (s, 4H)

Step 2: Preparation of 1,2-bis(4-(cyclopenta-2,4-diene-1-ylidene(phenyl)methyl)phenoxy)ethane

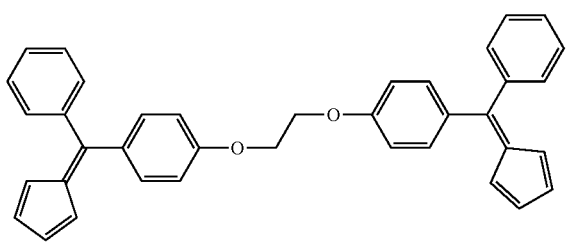 [SMILES: C1=CC(=C(c2ccccc2)c2ccc(OCCOc3ccc(C(=C4C=CC=C4)c4ccccc4)cc3)cc2)C=C1]

To a 100 mL Schlenk flask, ((ethane-1,2-diylbis(oxy))bis (4,1-phenylene))bis(phenylmethanone) (4.0 g, 7.47 mmol) prepared in step 1, pyrrolidine (2.4 ml) and THF (8.9 ml) were put. Sodium cyclopentadienide (sodium Cp) (2.0 M, 28.4 ml) was slowly added thereto dropwisely at room temperature. Stirring was performed at room temperature overnight. After that, the reaction product was extracted with distilled water and diethyl ether and recrystallized with methanol to obtain a final compound.

$^1$H NMR (CDCl$_3$): 7.41 (m, 6H), 7.34 (m, 8H), 6.99 (d, 4H), 6.63 (d, 4H), 6.37 (s, 2H), 6.28 (s, 2H), 4.42 (s, 4H)

Step 3: Preparation of 1,2-bis(4-(cyclopenta-2,4-diene-1-yl(1,1,4,4,7,7,10,10-octamethyl-2,3,4,7,8,9,10,12-octahydro-1H-dibenzo[b,h]fluorene-12-yl)(phenyl)methyl) phenoxy) ethane

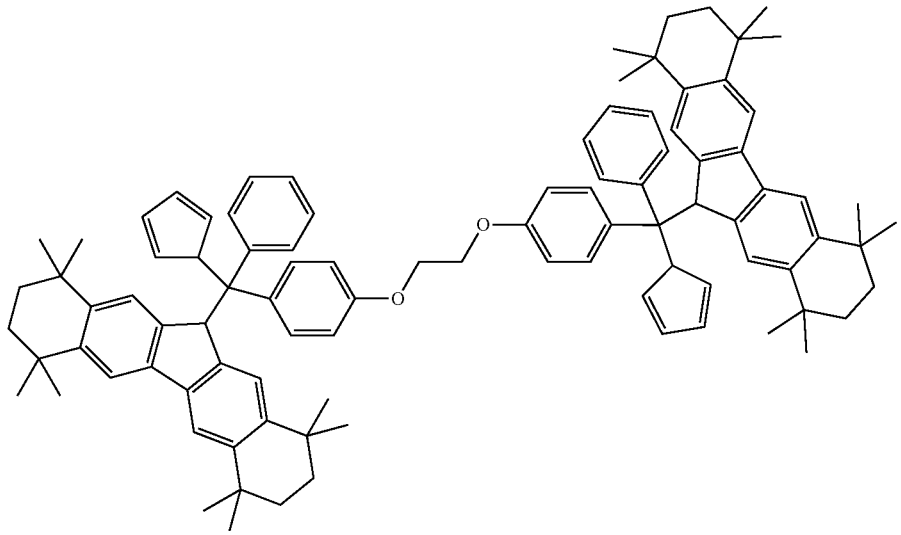 [SMILES: CC1(C)CCC(C)(C)c2cc3c(cc21)-c1cc2c(cc1C3C(c1ccccc1)(c1ccc(OCCOc3ccc(C(c4ccccc4)(C4C=CC=C4)C4c5cc6c(cc5-c5cc7c(cc54)C(C)(C)CCC7(C)C)C(C)(C)CCC6(C)C)cc3)cc1)C1C=CC=C1)C(C)(C)CCC2(C)C]

To a 100 mL Schlenk flask, 1,2-bis(4-(cyclopenta-2,4-diene-1-ylidene(phenyl)methyl)phenoxy)ethane (1.48 g, 2.85 mmol) prepared in step 2, and MTBE (13.0 ml) were put. To another 100 mL Schlenk flask, octahydro octa methylfluorene lithium (2.0 g), and MTBE (26.0 ml) were put, and the contents containing 1,2-bis(4-(cyclopenta-2,4-diene-1-ylidene(phenyl)methyl)phenoxy)ethane was added thereto dropwisely at room temperature. Stirring was performed at 50° C. overnight. After that, the reaction product was extracted with distilled water and diethyl ether and recrystallized with methanol to obtain a final compound.

$^1$H NMR (CDCl$_3$): 7.65-6.26 (m, 34H), 5.35 (m, 4H), 4.24 (m, 4H), 1.72 (m, 16H), 1.26 (m, 48H)

Step 4: Preparation of 1,2-bis(4-(cyclopenta-2,4-diene-1-yl(1,1,4,4,7,7,10,10-octamethyl-2,3,4,7,8,9,10,12-octahydro-1H-dibenzo[b,h]florene-12-yl)(phenyl)methyl)phenoxy)ethane-hafnium chloride

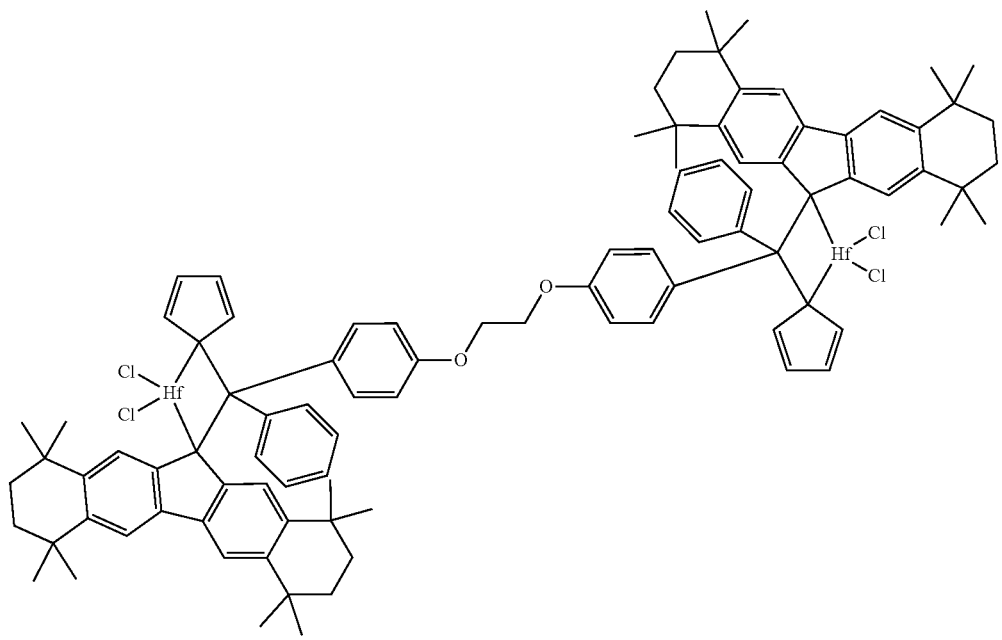

To a 100 mL Schlenk flask, 1,2-bis(4-(cyclopenta-2,4-diene-1-yl(1,1,4,4,7,7,10,10-octamethyl-2,3,4,7,8,9,10,12-octahydro-1H-dibenzo[b,h]fluorene-12-yl(phenyl)methyl) phenoxy) ethane (2.44 g, 1.89 mmol), toluene (18.2 ml) and THF (1.8 ml) were put. n-BuLi (3.1 ml) was slowly added thereto dropwise at −20° C. and stirred at room temperature overnight. HfCl (1.21 g) was slowly added thereto dropwise at −20° C., and stirring was performed at 60° C. overnight. Solvents were vacuum dried, and the crude product was extracted with hexane and methylene chloride (MC) to obtain a final compound.

$^1$H NMR (CDCl$_3$): 8.04-7.00 (m, 34H), 4.32 (m, 4H), 1.67-0.84 (m, 64H)

Example 2: Preparation of Ligand Compound and Transition Metal Compound

Step 1: Preparation of ethane-1,2-diylbis(4,1-phenylene)bis(phenylmethanone)

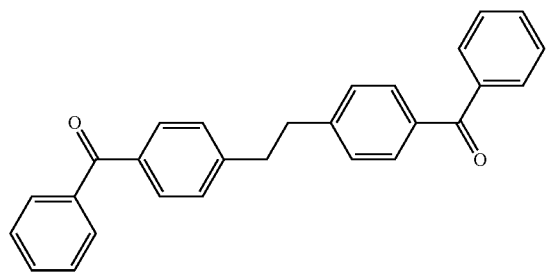 [SMILES: O=C(c1ccccc1)c1ccc(CCc2ccc(C(=O)c3ccccc3)cc2)cc1]

To a 100 mL Schlenk flask, 1,2-diphenylethane (5.0 g, 27.4 mmol), AlCl$_3$ (8.05 g) and 1,2-dichloroethane (98.0 ml) were put. Benzoyl chloride (2.05 eq, 7.90 g) was slowly added thereto dropwise at room temperature. Stirring was performed at 65° C. overnight. After that, the reaction product was extracted with ice water, 10% HCl, and distilled water to obtain a final compound.

$^1$H NMR (CDCl$_3$): 7.80 (m, 18H), 3.73 (s, 4H)

Step 2: Preparation of 1,2-bis(4-(cyclopenta-2,4-diene-1-ylidene(phenyl)methyl)phenyl)ethane

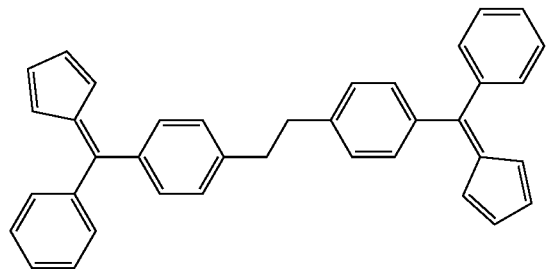 [SMILES: C1=CC(=C(c2ccccc2)c2ccc(CCc3ccc(C(=C4C=CC=C4)c4ccccc4)cc3)cc2)C=C1]

To a 100 mL Schlenk flask, ethane-1,2-diylbis(4,1-phenylene)bis(phenylmethanone) (6.36 g, 16.3 mmol) prepared in step 1, pyrrolidine (4.1 ml) and THF (15.4 ml) were put. Cyclopentadienide (sodium Cp) (2.0 M, 48.8 ml) was slowly added thereto dropwise at room temperature, and stirring was performed at room temperature overnight. After that, the reaction product was extracted with distilled water and diethyl ether and recrystallized with methanol to obtain a final compound.

$^1$H NMR (CDCl$_3$): 7.39-7.20 (m, 18H), 6.60 (m, 4H), 6.33 (m, 4H), 3.48 (s, 4H)

Step 3: Preparation of 1,2-bis(4-(cyclopenta-2,4-diene-1-yl(1,1,4,4,7,7,10,10-octamethyl-2,3,4,7,8,9,10,12-octahydro-1H-dibenzo[b,h]fluorene-12-yl (phenyl)methyl)phenyl)ethane

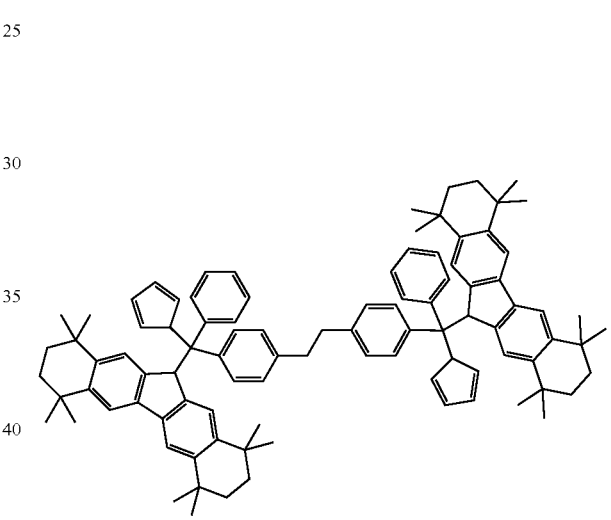

To a 100 mL Schlenk flask, 1,2-bis(4-(cyclopenta-2,4-diene-1-ylidene(phenyl)methyl)phenyl)ethane (1.38 g, 2.83 mmol) prepared in step 2, and MTBE (13.0 ml) were put. To another 100 mL Schlenk flask, octahydro octa methylfluorene lithium (2.0 g), and MTBE (26.0 ml) were put, and the contents containing 1,2-bis(4-(cyclopenta-2,4-diene-1-ylidene(phenyl)methyl)phenyl)ethane was added thereto dropwise at room temperature. Stirring was performed at 50° C. overnight. After that, the reaction product was extracted with distilled water and diethyl ether and recrystallized with methanol to obtain a final compound.

$^1$H NMR (CDCl$_3$): 7.69-6.30 (m, 34H), 5.41 (m, 4H), 3.78 (m, 4H), 1.64 (m, 16H), 1.28 (m, 48H)

Step 4: Preparation of 1,2-bis(4-(cyclopenta-2,4-diene-1-yl(1,1,4,4,7,7,10,10-octamethyl-2,3,4,7,8,9,10,12-octahydro-1H-dibenzo[b,h]florene-12-yl)(phenyl)methyl)phenyl)ethane-hafnium chloride

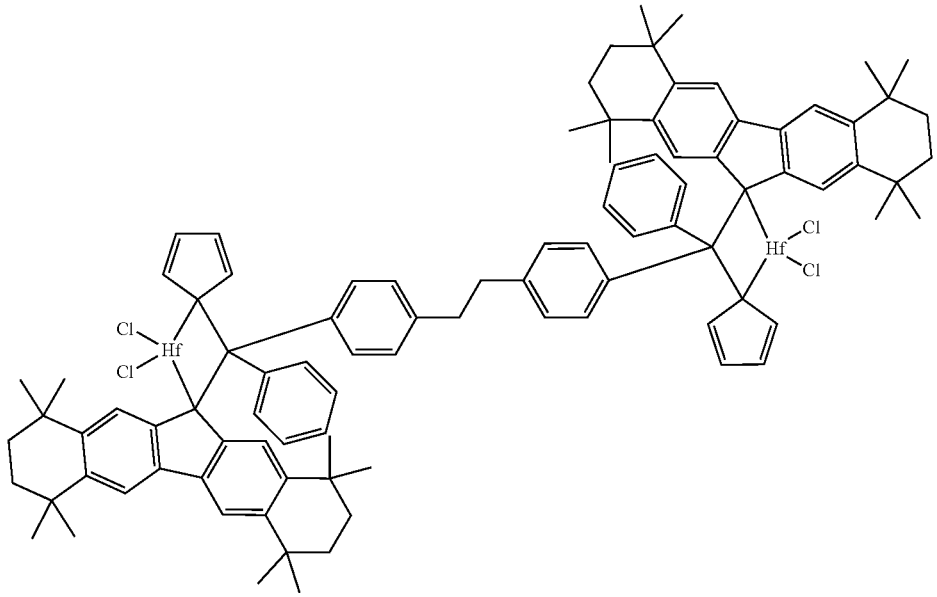

To a 100 mL Schlenk flask, 1,2-bis(4-(cyclopenta-2,4-diene-1-yl(1,1,4,4,7,7,10,10-octamethyl-2,3,4,7,8,9,10,12-octahydro-1H-dibenzo[b,h]fluorene-12-yl(phenyl)methyl)phenyl)ethane (2.05 g, 1.63 mmol), toluene (29.6 ml) and THF (3.0 ml) were put. n-BuLi (2.67 ml) was slowly added thereto dropwisely at −20° C., and stirring was performed at room temperature overnight. HfCl (1.04 g) was slowly added thereto dropwisely at −20° C., and stirring was performed at 60° C. overnight. After that, solvents were vacuum dried, and the crude product was extracted with hexane and methylene chloride to obtain a final compound.

$^1$H NMR (CDCl$_3$): 8.05-7.17 (m, 34H), 3.76 (m, 4H), 1.72-0.85 (m, 64H)

Comparative Example 1

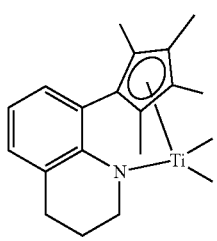

(1) Preparation of 8-(2,3,4,5-tetramethyl-1,3-cyclopentadienyl)-1,2,3,4-tetrahydroquinoline (i) Preparation of Lithium Carbamate 1,2,3,4-tetrahydroquinolin (13.08 g, 98.24 mmol) and diethyl ether (150 ml) were put in a Schlenk flask. The Schlenk flask was immersed in a low temperature bath of −78° C. made using dry ice and acetone and stirred for 30 minutes. Then, n-BuLi (39.3 ml, 2.5 M, 98.24 mmol) was injected under a nitrogen atmosphere using a syringe, and a pale yellow slurry was formed. Then, the flask was stirred for 2 hours, and the temperature of the flask was elevated to room temperature while removing butane gas produced. The flask was immersed in the low temperature bath of −78° C. again to decrease the temperature, and a CO$_2$ gas was injected. According to the injection of the carbon dioxide gas, the slurry disappeared, and a transparent solution was obtained. The flask was connected with a bubbler, and the temperature was elevated to room temperature while removing the carbon dioxide gas. Then, redundant CO$_2$ gas and solvent were removed in vacuum. The flask was transported to a dry box, and pentane was added thereto. The resultant mixture was vigorously stirred and filtered to obtain lithium carbamate as a while solid compound. Diethyl ether made a coordination bond in the white solid compound. Yield was 100%.

$^1$H NMR (C$_6$D$_6$, C$_5$D$_5$N): δ 1.90 (t, J=7.2 Hz, 6H, ether), 1.50 (br s, 2H, quin-CH$_2$), 2.34 (br s, 2H, quin-CH$_2$), 3.25 (q, J=7.2 Hz, 4H, ether), 3.87 (br, s, 2H, quin-CH$_2$), 6.76 (br d, J=5.6 Hz, 1H, quin-CH) ppm $^{13}$C NMR (C$_6$D$_6$): δ 24.24, 28.54, 45.37, 65.95, 121.17, 125.34, 125.57, 142.04, 163.09(C=O) ppm (ii) Preparation of 8-(2,3,4,5-tetramethyl-1,3-cyclopentadienyl)-1,2,3,4-tetrahydroquinoline

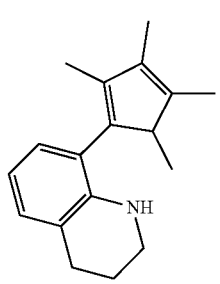 [SMILES: CC1=C(C)C(C)C(c2cccc3c2NCCC3)=C1C]

The lithium carbamate compound (8.47 g, 42.60 mmol) prepared in step (i) was put in a Schlenk flask. Then, tetrahydrofuran (4.6 g, 63.9 mmol) and 45 ml of diethyl ether were put in order. The Schlenk flask was immersed in a low temperature bath of −20° C. made using acetone and a small amount of dry ice and stirred for 30 minutes, and t-BuLi (25.1 ml, 1.7 M, 42.60 mmol) was put. In this case, the color of the reaction mixture was changed to red. Stirring was performed for 6 hours while maintaining −20° C. A solution of CeCl$_3$·2LiCl (129 ml, 0.33 M, 42.60 mmol) dissolved in tetrahydrofuran and tetramethylcyclopentenone (5.89 g, 42.60 mmol) were mixed in a syringe and then injected into the flask under a nitrogen atmosphere. The temperature of the flask was slowly elevated to room temperature, and after 1 hour, a thermostat was removed, and the temperature was maintained at the room temperature. Then, water (15 ml) was added to the flask, and ethyl acetate was added. Then, the resultant product was filtered, and a filtrate was obtained. The filtrate was transported to a separating funnel, and hydrochloric acid (2 N, 80 ml) was added thereto, followed by shaking for 12 minutes. Then, a saturated sodium bicarbonate aqueous solution (160 ml) was added to neutralize, and an organic layer was extracted. Anhydrous magnesium sulfate was added to the organic layer to remove moisture, and filtering was performed. A filtrate was obtained, and solvent was removed. The filtrate thus obtained was separated by column chromatography using a solvent of hexane and ethyl acetate (v/v, 10:1) to obtain a yellow oil. Yield was 40%.

$^1$H NMR (C$_6$D$_6$): δ 1.00 (br d, 3H, Cp-CH$_3$), 1.63-1.73 (m, 2H, quin-CH$_2$), 1.80 (s, 3H, Cp-CH$_3$), 1.81 (s, 3H, Cp-CH$_3$), 1.85 (s, 3H, Cp-CH$_3$), 2.64 (t, J=6.0 Hz, 2H, quin-CH$_2$), 2.84-2.90 (br, 2H, quin-CH$_2$), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm (2) Preparation of [(1,2,3,4-tetrahydroquinolin-8-yl)tetramethylcyclopentadienyl-η$^5$,κ-N]titanium dimethyl

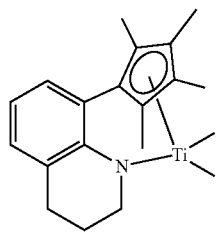

(i) Preparation of (1,2,3,4-tetrahydroquinolin-8-yl)tetramethylcyclopentadienyl-η$^5$,κ-N]dilithium In a dry box, 8-(2,3,4,5-tetramethyl-1,3-cyclopentadienyl)-1,2,3,4-tetrahydroquinoline (8.07 g, 32.0 mmol) prepared through step (1) and 140 ml of diethyl ether were put in a round flask, followed by decreasing the temperature to −30° C. Then, n-BuLi (17.7 g, 2.5 M, 64.0 mmol) was slowly added thereto while stirring. The reaction was performed for 6 hours while elevating the temperature to room temperature. After that, a solid was obtained by washing with diethyl ether several times and filtering. Remaining solvent was removed by applying vacuum to obtain a dilithium compound (9.83 g) as a yellow solid. Yield was 95%.

$^1$H NMR (C$_6$D$_6$, C$_5$D$_5$N): δ 2.38 (br s, 2H, quin-CH$_2$), 2.53 (br s, 12H, Cp-CH$_3$), 3.48 (br s, 2H, quin-CH$_2$), 4.19 (br s, 2H, quin-CH$_2$), 6.77 (t, J=6.8 Hz, 2H, quin-CH), 7.28 (br s, 1H, quin-CH), 7.75 (brs, 1H, quin-CH) ppm (ii) Preparation of (1,2,3,4-tetrahydroquinolin-8-yl)tetramethylcyclopentadienyl-η$^5$,κ-N]titanium dimethyl In a dry box, TiCl$_4$·DME (4.41 g, 15.76 mmol) and diethyl ether (150 ml) were put in a round flask, and MeLi (21.7 ml, 31.52 mmol, 1.4 M) was slowly added thereto while stirring at −30° C. After stirring for 15 minutes, the (1,2,3,4-tetrahydroquinolin-8-yl)tetramethylcyclopentadienyl-η$^5$,κ-N]dilithium compound (5.30 g, 15.76 mmol) prepared in step (i) was added to the flask. Stirring was performed for 3 hours while elevating the temperature to room temperature. After finishing the reaction, vacuum was applied to remove solvent, and the resultant product was dissolved in pentane and filtered. A filtrate was taken. By removing pentane by applying vacuum, a concentrated brown compound (3.70 g) was obtained. Yield was 71.3%.

$^1$H NMR (C$_6$D$_6$): δ 0.59 (s, 6H, Ti—CH$_3$), 1.66 (s, 6H, Cp-CH$_3$), 1.69 (br t, J=6.4 Hz, 2H, quin-CH$_2$), 2.05 (s, 6H, Cp-CH$_3$), 2.47 (t, J=6.0 Hz, 2H, quin-CH$_2$), 4.53 (m, 2H, quin-CH$_2$), 6.84 (t, J=7.2 Hz, 1H, quin-CH), 6.93 (d, J=7.6 Hz, quin-CH), 7.01 (d, J=6.8 Hz, quin-CH) ppm $^{13}$C NMR (C$_6$D$_6$): δ 12.12, 23.08, 27.30, 48.84, 51.01, 119.70, 119.96, 120.95, 126.99, 128.73, 131.67, 136.21 ppm Preparation Example of Polymer Experimental Examples 1 and 2, and Comparative Experimental Example 1

To a 2 L Buchi reactor, a hexane solvent (1.0 L) and 1-octene (in an amount shown in Table 1 below) were added, and the reactor was pre-heated to 150° C. At the same time, the pressure of the reactor was charged with ethylene (35 bars) in advance. A catalyst in a corresponding amount and 10 eq of a dimethylanilinium tetrakis(pentafluorophenyl) borate (AB) cocatalyst of the catalyst were injected to the reactor in order by applying argon with a high pressure. Then, a copolymerization reaction was performed for 8 minutes. After that, the remaining ethylene gas was exhausted out, and a polymer solution was added to an excessive amount of ethanol to induce precipitation. The precipitated polymer was washed with ethanol twice or three times, and dried in a vacuum oven at 90° C. for 12 hours or more, and the physical properties thereof were measured.

Various polymers were prepared in accordance with the polymerization temperature, a main catalyst and a catalyst listed in Table 1 below, and the results are shown in Table 1 below.

Evaluation of Physical Properties

<Catalyst Activity>

Calculated by dividing the weight (kg) of the polymer obtained by the amount used (mmol) of the transition metal compound (main catalyst) used.

<Melt Index (MI) of Polymer>

Measured according to ASTM D1238 [condition E, MI10 (190° C., 10 kg load), MI2.16 (190° C., 2.16 kg load], and a molten flow rate ratio (MFRR) was calculated by dividing MI10 by MI2.16.

<Density of Polymer>

The density of a polymer was obtained by manufacturing a sheet having a thickness of 3 mm and a radius of 2 cm using a press mold at 190° C., annealing thereof at room temperature for 24 hours, and conducting measurement using a Mettler balance.

<Weight Average Molecular Weight>

Shown as converted numerical with respect to standard polystyrene of which weight average molecular weight (Mw) was measured using gel permeation chromatography (GPC, manufactured by Water Co.).

column: PL Olexis solvent: trichlorobenzene (TCB)

flow rate: 1.0 ml/min specimen concentration: 1.0 mg/ml injection amount: 200 μl column temperature: 160° C.

detector: Agilent high temperature IR detector

<Crystallization Temperature (Tc) and Melting Temperature (Tm) of Polymer>

The crystallization temperature (Tc) of a polymer and melting temperature (Tm) of a polymer were obtained using a differential scanning calorimeter (DSC: Differential Scanning Calorimeter 6000) manufactured by PerkinElmer Co. Particularly, by using DSC, the temperature of a copolymer was increased to 200° C. under a nitrogen atmosphere and kept for 5 minutes. Then, the temperature was decreased to 30° C. and then, a DSC curve was observed while increasing the temperature again. In this case, the temperature increasing rate and decreasing rate were 10° C./min, respectively. In the measured DCS curve, the crystallization temperature was the maximum position of heating peak during cooling, and the melting temperature was the maximum position of heat absorption peak during secondly increasing the temperature.

When comparing Comparative Experimental Example 1 with Experimental Examples 1 and 2, it could be confirmed that the catalyst compositions including the compounds of Examples 1 and 2 of the present invention showed higher catalyst activity and could prepare a polymer having a higher molecular weight in a similar density.

The invention claimed is:

1. A transition metal compound represented by Formula 1:

[Formula 1]

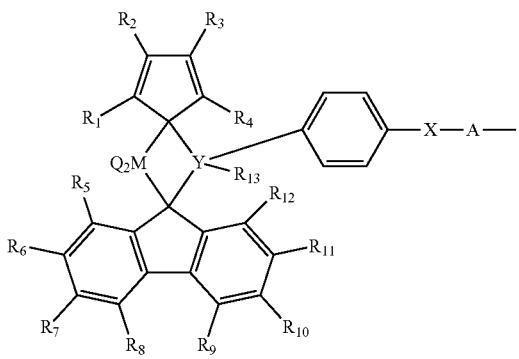

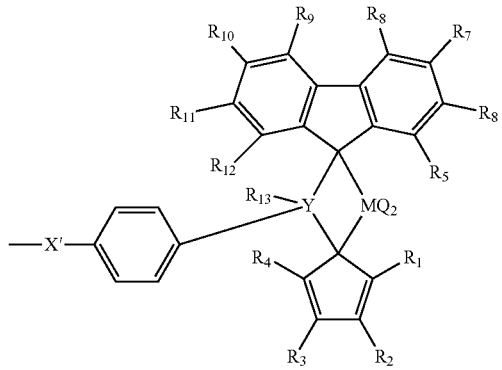

TABLE 1

| Cat. | Cat compound (injection amount mmol) | Octene (mL) | Amount obtained (g) | Activity (kgPE/mmol) | Density (g/cc) | $MI_{2.16}$ | $MI_{10}$ | MFRR | Mw (g/mol) | Tc (° C.) | Tm (° C.) |
|---|---|---|---|---|---|---|---|---|---|---|---|
| Comparative Experimental Example 1 | Comparative Example 2 | 170 | 40.7 | 20.4 | 0.871 | 2.61 | 21.0 | 8.05 | 93786 | 46.8 | 57.2 |
| Experimental Example 1 | Example 1 0.75 | 250 | 40.1 | 26.7 | 0.870 | 0.017 | 0.16 | 9.41 | 295674 | 46.9 | 56.3 |
| Experimental Example 2 | Example 2 0.75 | 250 | 45.6 | 30.4 | 0.871 | 0.018 | 0.20 | 11.11 | 283234 | 44.6 | 55.6 |

AB: dimethylanilinium tetrakis(pentafluorophenyl) borate cocatalyst wherein, in Formula 1, $R_1$ to $R_{13}$ are each independently hydrogen, halogen, alkyl of 1 to 20 carbon atoms, cycloalkyl of 3 to 20 carbon atoms, alkenyl of 2 to 20 carbon atoms, alkoxy of 1 to 20 carbon atoms, aryl of 6 to 20 carbon atoms, arylalkoxy of 7 to 20 carbon atoms, alkylaryl of 7 to 20 carbon atoms, arylalkyl of 7 to 20 carbon atoms, silyl, or silyl having one to three substituents selected from the group consisting of alkyl of 1 to 12 carbon atoms, and alkoxy of 1 to 12 carbon atoms, where adjacent two or more groups among $R_1$ to $R_{12}$ are optionally connected with each other to form a ring, X and X' are each independently O or S, A is alkylene of 1 to 6 carbon atoms, Y is C or Si, M is Zr or Hf, and Q is hydrogen, halogen; alkyl of 1 to 20 carbon atoms, cycloalkyl of 3 to 20 carbon atoms, alkenyl of 2 to 20

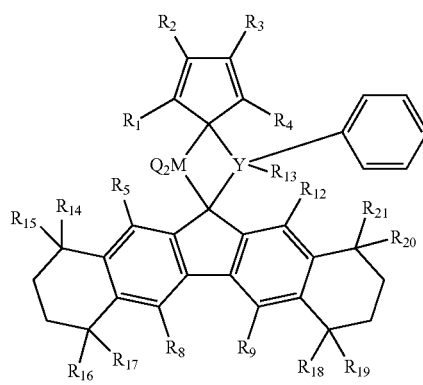

carbon atoms, aryl of 6 to 20 carbon atoms, alkylaryl of 7 to 20 carbon atoms, arylalkyl of 7 to 20 carbon atoms, alkylamino of 1 to 20 carbon atoms, or arylamino of 6 to 20 carbon atoms.

2. The transition metal compound according to claim 1, wherein $R_1$ to $R_{12}$ are each independently hydrogen, halogen, alkyl of 1 to 20 carbon atoms, cycloalkyl of 3 to 20 carbon atoms, alkenyl of 2 to 20 carbon atoms, alkoxy of 1 to 20 carbon atoms, silyl, or silyl having one to three substituents selected from the group consisting of alkyl of 1 to 12 carbon atoms, and alkoxy of 1 to 12 carbon atoms, where adjacent two or more groups among $R_1$ to $R_{12}$ are optionally connected with each other to form a ring, $R_{13}$ is hydrogen, halogen, alkyl of 1 to 12 carbon atoms, cycloalkyl of 3 to 12 carbon atoms, aryl of 6 to 12 carbon atoms, alkylaryl of 7 to 12 carbon atoms, or arylalkyl of 7 to 12 carbon atoms, M is Zr or Hf, and Q is hydrogen, halogen, alkyl of 1 to 20 carbon atoms; cycloalkyl of 3 to 20 carbon atoms, aryl of 6 to 20 carbon atoms, alkylaryl of 7 to 20 carbon atoms, or arylalkyl of 7 to 20 carbon atoms.

3. The transition metal compound according to claim 1, wherein $R_1$ to $R_{12}$ are each independently hydrogen, alkyl of 1 to 12 carbon atoms; cycloalkyl of 3 to 12 carbon atoms; silyl, or silyl having one to three substituents selected from the group consisting of alkyl of 1 to 12 carbon atoms, and alkoxy of 1 to 12 carbon atoms, where adjacent two or more groups among $R_1$ to $R_{12}$ are optionally connected with each other to form a ring, $R_{13}$ is hydrogen, alkyl of 1 to 12 carbon atoms, aryl of 6 to 12 carbon atoms, alkylaryl of 7 to 12 carbon atoms, or arylalkyl of 7 to 12 carbon atoms, M is Zr or Hf, and Q is hydrogen, halogen, alkyl of 1 to 12 carbon atoms, or cycloalkyl of 3 to 12 carbon atoms.

4. The transition metal compound according to claim 1, which is represented by Formula 2:

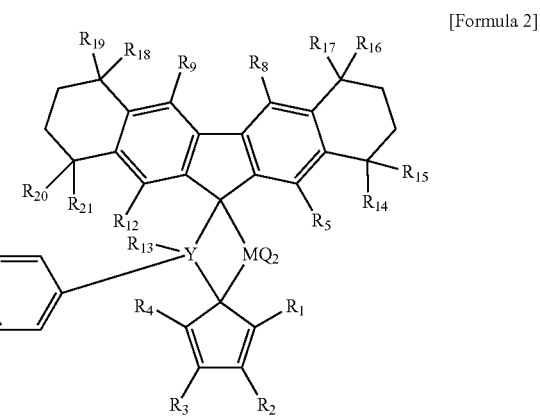

[Formula 2]

wherein, in Formula 2, $R_1$ to $R_4$, $R_5$, $R_8$, $R_9$ and $R_{12}$ are each independently hydrogen or alkyl of 1 to 12 carbon atoms, $R_{13}$ is hydrogen, alkyl of 1 to 12 carbon atoms, aryl of 6 to 12 carbon atoms, or alkylaryl of 7 to 12 carbon atoms, $R_{14}$ to $R_{21}$ are each independently hydrogen or alkyl of 1 to 6 carbon atoms, M is Hf, and Q is halogen or alkyl of 1 to 12 carbon atoms.

5. The transition metal compound according to claim 4, wherein $R_1$ to $R_4$, $R_5$, $R_8$, $R_9$ and $R_{12}$ are hydrogen, $R_{13}$ is aryl of 6 to 12 carbon atoms, A is ethylene, Y is C, M is Hf, and Q is alkyl of 1 to 6 carbon atoms.

6. The transition metal compound according to claim 1, which is represented by Formula 1-1:

[Formula 1-1]

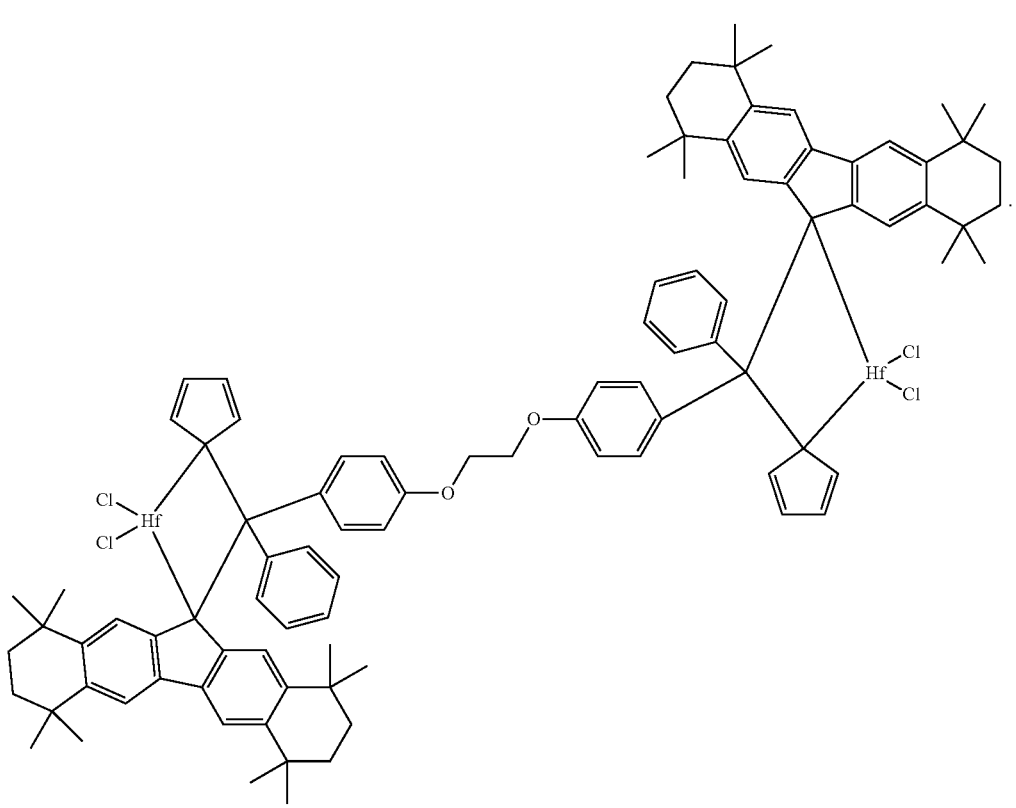

7. A catalyst composition comprising the transition metal compound of claim 1, wherein the catalyst composition is a polymerization catalyst for polyolefin.

8. The catalyst composition according to claim 7, further comprising one or more cocatalysts.

9. The catalyst composition according to claim 8, wherein the one or more cocatalysts comprise one or more compounds of Formulae 3, 4 or 5:

$$[Al(R_{22})-O]_a- \quad \text{[Formula 3]}$$

where $R_{22}$ is each independently a halogen radical, a hydrocarbyl radical of 1 to 20 carbon atoms, or a halogen substituted hydrocarbyl radical of 1 to 20 carbon atoms, and a is an integer of 2 or more, $$D(R_{22})_3 \quad \text{[Formula 4]}$$

where D is aluminum or boron, and $R_{22}$ is each independently the same as defined above, $$[L-H]^+[Z(A)_4]^- \text{ or } [L]^+[Z(A)_4]^- \quad \text{[Formula 5]}$$

where L is a neutral or a cationic Lewis acid, H is a hydrogen atom, Z is an element in group 13, and A is each independently aryl of 6 to 20 carbon atoms, or alkyl of 1 to 20 carbon atoms, where one or more hydrogen atoms are optionally substituted with a halogen, hydrocarbyl of 1 to 20 carbon atoms, alkoxy of 1 to 20 carbon atoms, or aryloxy of 6 to 20 carbon atoms.

10. The catalyst composition according to claim 7, further comprising a reaction solvent.

11. A method for preparing a polymer, the method comprising contacting the catalyst composition of claim 7 with one or more olefin monomers.

* * * * *